(12) United States Patent  
Chen et al.

(10) Patent No.: US 9,201,543 B2  
(45) Date of Patent: Dec. 1, 2015

(54) OPTICAL NAVIGATING APPARATUS AND COMPUTER READABLE RECORDING MEDIA FOR PERFORMING OPTICAL NAVIGATING METHOD

(71) Applicant: PixArt Imaging Inc., Hsin-Chu (TW)

(72) Inventors: Chun-Chen Chen, Hsin-Chu (TW); Hsin-Chia Chen, Hsin-Chu (TW); Yen-Min Chang, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 230 days.

(21) Appl. No.: 13/735,034

(22) Filed: Jan. 7, 2013

(65) Prior Publication Data

US 2014/0071093 A1    Mar. 13, 2014

(30) Foreign Application Priority Data

Sep. 7, 2012   (TW) .............................. 101132786 A

(51) Int. Cl.  
*G06F 3/042* (2006.01)  
*G06F 1/32* (2006.01)  
*G06F 3/041* (2006.01)

(52) U.S. Cl.  
CPC .............. *G06F 3/042* (2013.01); *G06F 1/3259* (2013.01); *G06F 3/0416* (2013.01); *Y02B 60/1253* (2013.01); *Y02B 60/148* (2013.01)

(58) Field of Classification Search  
CPC ....... G06F 3/03; G06F 3/033; G06F 3/03547; G06F 3/0395  
USPC ......................................................... 345/175  
See application file for complete search history.

(56) References Cited

U.S. PATENT DOCUMENTS

| | | | |
|---|---|---|---|
| 2005/0162394 A1* | 7/2005 | Chiu et al. | 345/166 |
| 2008/0162996 A1* | 7/2008 | Krah et al. | 714/27 |
| 2009/0058833 A1* | 3/2009 | Newton | 345/175 |
| 2011/0187651 A1* | 8/2011 | Whitlow et al. | 345/173 |

* cited by examiner

*Primary Examiner* — Mark Regn  
(74) *Attorney, Agent, or Firm* — Winston Hsu; Scott Margo

(57) ABSTRACT

An optical navigating apparatus, comprising: a displacement detecting apparatus, for determining if the optical navigating apparatus has displacement relative to an target, and for generating a displacement signal according to the displacement; and a touch control panel, for detecting a touch control operation of an user, wherein the touch control panel has a sampling rate and changes the sampling rate according to a control signal, wherein the sampling rate can be adjusted according to the displacement signal, where the sampling rate correspondingly decreases when the displacement signal indicates the displacement increases.

20 Claims, 5 Drawing Sheets

OPTICAL NAVIGATING APPARATUS AND COMPUTER READABLE RECORDING MEDIA FOR PERFORMING OPTICAL NAVIGATING METHOD

BACKGROUND OF THE INVENTION

1. Field of the Invention

The present invention relates to an optical navigating apparatus and a computer readable recording media for performing an optical navigating method, and particularly relates to an optical navigating apparatus and a computer readable recording media for performing an optical navigating method, which can change a sampling rate of a touch control panel.

2. Description of the Prior Art

In recent days, a conventional mouse utilizing a scrolling ball is gradually replaced with an optical displacement detecting apparatus or an optical touch control apparatus.

FIG. 1A and FIG. 1B are schematic diagrams illustrating a conventional optical touch control apparatus 100, which detects a touch control operation for a finger on the optical touch control panel. FIG. 1A is a cross-section diagram of the optical touch control apparatus 100. Also, FIG. 1B is a circuit block diagram illustrating a circuit inside the optical touch control apparatus 100, which is utilized to control the operation of the optical touch control apparatus 100. The optical touch control apparatus 100 includes an optical touch control panel 103, a light source 105, an optical sensor 107 (or called an image sensor), lens 109, 111, a processing unit 113, a storage apparatus 115 and a light source control unit 117. The light emitting operation of the light source 105 is controlled by the light control unit 117 and emits light to the finger F on the optical touch control panel 103 to generate an image. The optical sensor 107 catches frames in the image. Also, the processing unit 113 computes a touch control operation of the finger F according to caught frames. Additionally, the processing unit 113 controls data accessing of the storage apparatus and operation of the light source control unit 117.

FIG. 2 is a schematic diagram illustrating a conventional optical displacement detecting apparatus 200 such as an optical mouse, which can be utilized for an optical displacement detection, to detect displacement between the optical displacement detecting apparatus 200 and a surface 202. The optical displacement detecting apparatus 200 shown in FIG. 2 includes a light source 205, an optical sensor 207, a processing unit 213, and a light source control unit 217. The light source control unit 217 controls the light source 205 to illuminates a surface 202 (ex. the desk surface that the mouse is put thereon) to form an image. The optical sensor 207 catches frames in an image and buffers the frames in a storage apparatus 215. Also, the processing unit 213 computes a speed and an acceleration of the optical displacement detecting apparatus 200 according to the frames caught by the optical sensor, to perform a tracking operation. The optical displacement detecting apparatus 200 also includes a control interface 209, which includes input devices such as a scrolling wheel and a button.

The optical touch control apparatus and the optical displacement detecting apparatus shown in FIG. 1 and FIG. 2 can be combined to form a single optical navigating apparatus. That is, the control interface 209 of the optical displacement detecting apparatus 200 can be replaced with the optical touch control panel 103 shown in FIG. 1, such that the optical navigating apparatus can perform both the optical touch control and the optical displacement detecting. In such apparatus, the light sources 105/205, optical sensors 107/207, the processing units 113.213, the storage apparatuses 115/215 and the light control units 117/217 can be respectively independent, but can be shared as well. For example, a single optical sensor can not only be utilized as the optical sensor 107 but also as the optical sensor 207.

Additionally, accurate control of power in such apparatus is needed in order to save power consumption, since the conventional control interface is replaced with the optical touch panel and the optical touch control and the optical displacement detecting both need power. However, a conventional optical touch control panel needs to continuously perform sampling to detect if any touch control operation exists, to maintain the sensitivity for touch control operation detecting. Also, the sampling rate of the optical touch control panel is fixed and does not change corresponding to different operations of the optical navigating apparatus. Therefore, the power efficiency thereof is low.

SUMMARY OF THE INVENTION

Therefore, one objective of the present invention is to provide an optical navigating apparatus and an optical navigating method, such that the sampling rate of the touch control panel can be adjusted according to the displacement of the optical navigating apparatus.

One embodiment of the present invention discloses an optical navigating apparatus, comprising: a displacement detecting apparatus, for determining if the optical navigating apparatus has displacement relative to an target, and for generating a displacement signal according to the displacement; and a touch control panel, for detecting a touch control operation of an user, wherein the touch control panel has a sampling rate and changes the sampling rate according to a control signal, wherein the sampling rate can be adjusted according to the displacement signal, where the sampling rate correspondingly decreases when the displacement signal indicates the displacement increases.

Another embodiment of the present invention discloses a computer readable recording media, having at least one program code recorded thereon, an optical navigating method is performed when the program code is read and executed, wherein the optical navigating method includes: determining if an optical navigating apparatus has displacement relative to an target, and generating a displacement signal according to the displacement; utilizing a touch control panel to detect a touch control operation of an user; and changing a sampling rate of the touch control panel according to a control signal, wherein the sampling rate correspondingly decreases when the displacement signal indicates the displacement increases.

In view of above-mentioned embodiments, the sampling rate of the touch control panel can be adjusted according to the displacement of the optical navigating apparatus. Therefore, the power efficiency can be increased without affecting the sensitivity of the touch control detecting.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
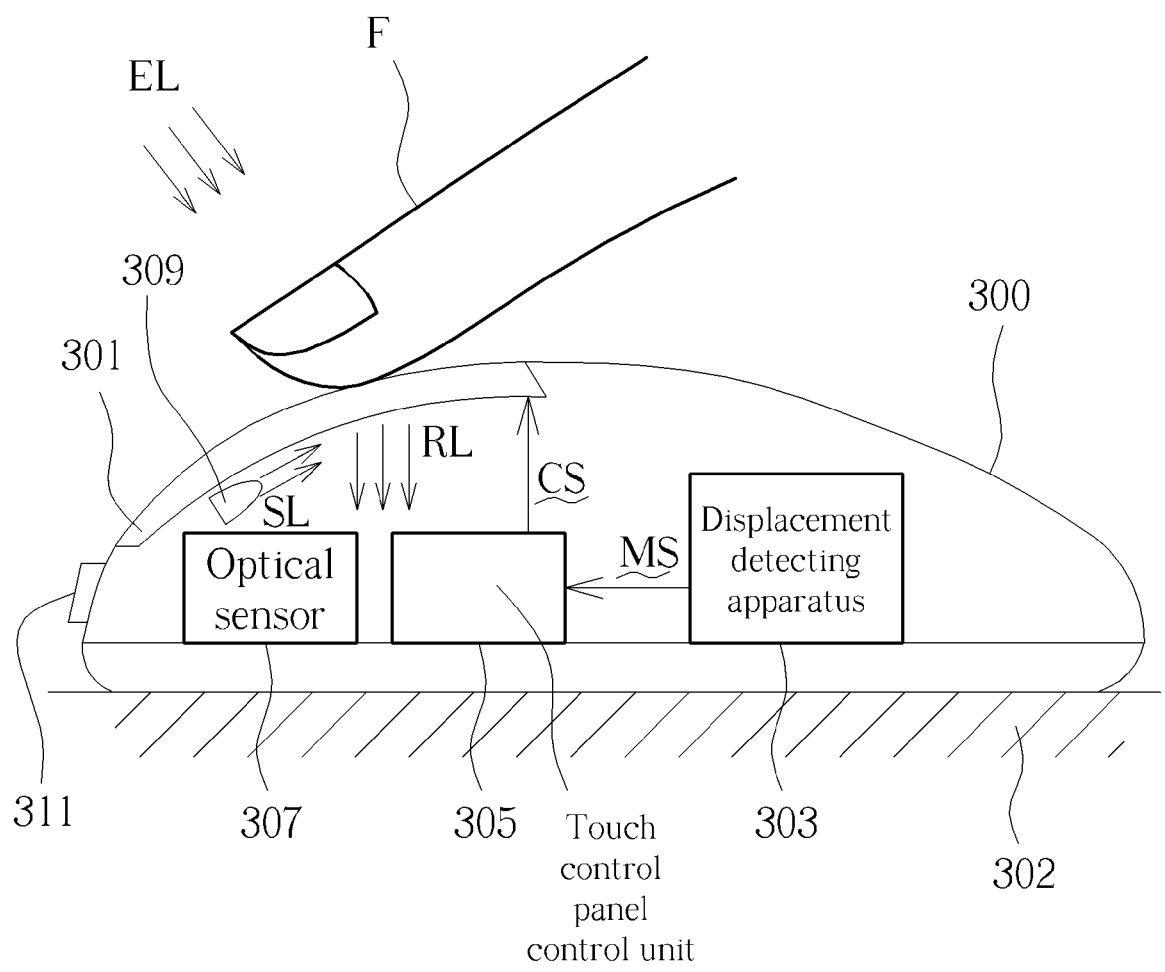
FIG. 3 is a schematic diagram illustrating an optical navigating apparatus according to one embodiment of the present invention.

FIG. 3 is a schematic diagram illustrating an optical navigating apparatus 300 according to one embodiment of the present invention. The optical navigating apparatus 300 can perform either the touch control function or the displacement detecting function, thus it can be regarded as an optical mouse as well. As shown in FIG. 3, the optical navigating apparatus 300 comprises an optical touch control panel 301, a displacement detecting apparatus 303 and a touch control panel control unit 305. The optical touch control panel 301 detects a touch control operation of a user. The touch control panel 301 has a sampling rate and changes the sampling rate thereof according to a control signal CS. The sampling rate can be adjusted according to a displacement signal MS. Also, the sampling rate correspondingly decreases when the displacement signal MS indicates the displacement increases. Oppositely, the sampling rate correspondingly increases when the displacement signal MS indicates the displacement decreases. The displacement detecting apparatus 303 determines if the optical navigating apparatus 300 has displacement relative to an target such as a surface 302, and generates the displacement signal MS according to the displacement. The displacement signal MS is utilized to generate the control signal CS to change the sampling rate.

Figure 4:
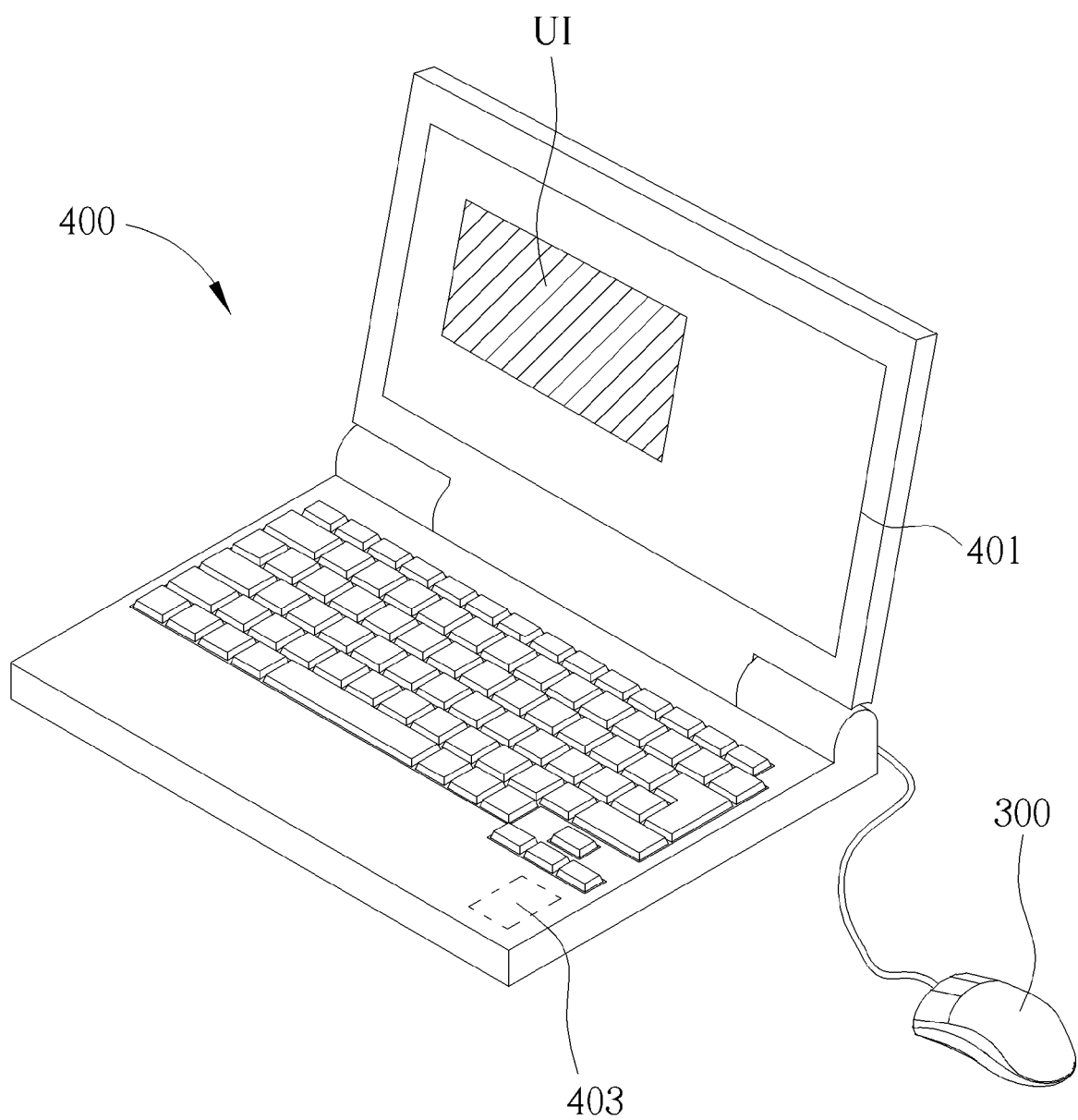
FIG. 4 is a schematic diagram illustrating an optical navigating apparatus according to another embodiment of the present invention.

In the embodiment shown in FIG. 3, a touch panel control unit 305 is utilized to receive the displacement signal MS to generate the control signal CS. Such touch panel control unit 305 can be implemented via writing firmware to a processor which is also utilized to control operation of the touch panel control unit 305. Alternatively, the touch panel control unit 305 can be a hardware circuit independent from other circuits. The control signal CS can also be generated by an apparatus outside the optical navigating apparatus 300. In the embodiment shown in FIG. 4, the optical navigating apparatus 300 is coupled to an electronic apparatus (a notebook in this embodiment). The electronic apparatus 400 includes a display 401 for displaying different contents corresponding to movement for an object on the touch control panel of the optical navigating apparatus 300 or the displacement that the optical navigating apparatus 300 is relative to the surface which it is put thereon. The electronic apparatus 400 can comprise a processor 403, which is utilized to control operation of the electronic apparatus 400 and is utilized to generate the control signal CS to the optical navigating apparatus 300.

Please refer to FIG. 3 again. The optical navigating apparatus 300 can further comprise a switch 311 for determining if the optical navigating apparatus 300 enters an adjusting mode. The sampling rate of the optical touch control panel can be adjusted in the adjusting mode. The switch 311 can further be utilized to determine an adjusting range of the sampling rate after been adjusted (i.e. the minimum and the maximum value of the sampling rate), besides utilized to determine if the optical navigating apparatus 300 enters the adjusting mode. Additionally, the sampling rate can be directly set via the switch 311, such that the sampling rate can be adjusted corresponding to different environments or the remained power of the optical navigating apparatus. Please note the switch 311 can be a hardware switch but also can be software form such that a user interface (ex. the user interface UI provided on the display 401 of the electronic apparatus 400 in the embodiment shown in FIG. 4) can be utilized to set if the optical navigating apparatus 300 enters the adjusting mode. Accordingly, it can be regarded as that the optical navigating apparatus 300 has a switch mechanism, which can be software or hardware, to determine if the optical navigating apparatus enters the adjusting mode, to determine an adjusting range of the sampling rate, or to directly determine the sampling rate.

Figure 5:
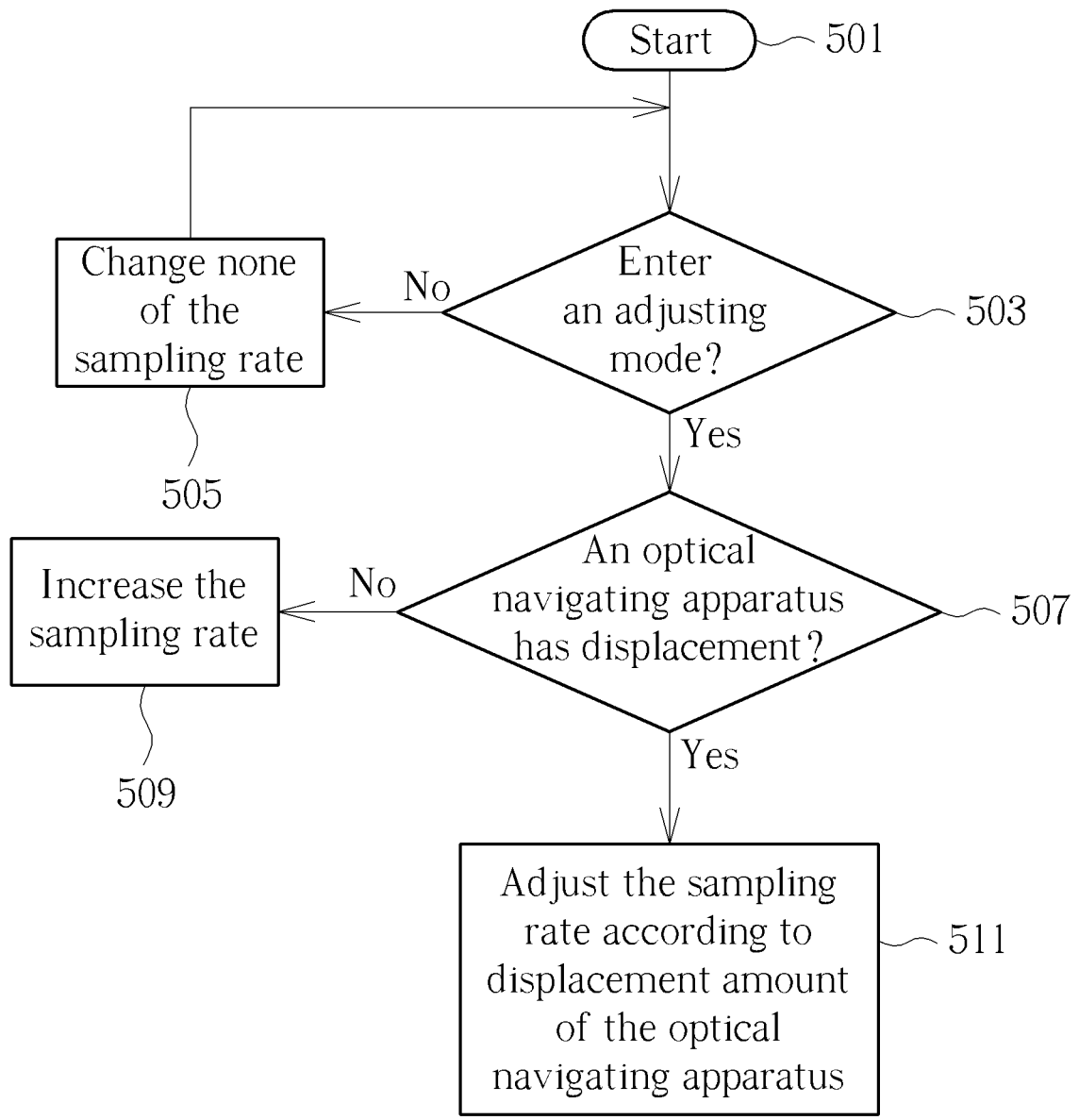
FIG. 5 is a schematic diagram illustrating an optical navigating method according to one embodiment of the present invention.

FIG. 5 is a schematic diagram illustrating an optical navigating method according to one embodiment of the present invention. Such optical navigating method can be performed via a computer readable recording media such as an optical disc, a hard disk or a memory. For example, a program can be written to the computer readable recording media such that the program can be executed to perform the following steps, but it does not limit. Also, please refer to both FIG. 3 and FIG. 5 to understand the present invention for more clear. The optical navigating method shown in FIG. 5 includes the following steps:

Step 501
Start.
Step 503
Determine if the optical navigating apparatus enters an adjusting mode. As above-mentioned, a switch 311 can be utilized to determine if the optical navigating apparatus enters the adjusting mode. If yes, enters the step 507, if not, enters the step 505.
Step 505
Change none of the sampling rate.
Step 507
Determine if an optical navigating apparatus has displacement. If not, go to step 509, if yes, go to step 511.
Step 509
Increase the sampling rate.
Step 511
Adjust the sampling rate according to displacement amount of the optical navigating apparatus.

In one embodiment, the sampling rate correspondingly decreases when the displacement signal MS indicates the displacement increases. Oppositely, the sampling rate correspondingly increases when the displacement signal MS indicates the displacement decreases. According to the behavior of a normal user, the probability for performing the touch control operation is low when the displacement of the optical navigating apparatus increases (ex. the optical navigating apparatus has a larger displacement distance on the desk), thus the sampling rate of the optical touch control panel can be decreased. Oppositely, the probability for performing the touch control operation is high when the displacement of the optical navigating apparatus decreases or even the optical navigating apparatus does not move, thus the sampling rate of the optical touch control panel can be increased.

In another embodiment, it can be determined that if the optical navigating apparatus indicates being unable to detect a target, to determine if the optical navigating apparatus is raised or put on a surface (i.e. the above-mentioned surface). If the optical navigating apparatus is determined that it is raised, the sampling rate increases. Therefore, the step 507 can be placed with "if a target could be detected?". The sampling rate of the optical touch control panel is increased since the probability for performing the touch control operation is high if the target could not be detected.

Detail structures of the optical navigating apparatus will be detailedly explained in the following description. Please refer to FIG. 3 again, the touch control detecting function of the optical touch control panel 301 and the displacement detecting function of the displacement detecting apparatus 303 can be performed by the optical touch control apparatus 100 shown in FIG. 1 and the optical displacement detecting apparatus 200 shown in FIG. 2. Therefore, the optical navigating apparatus 300 can comprise an optical sensor 307, for receiving reflected light generated by a touch control operation of a user to detect the touch control operation. For example, the optical sensor 307 detects the reflected light RL, which is generated via the reflection of the light SL from the light source 309 to the finger F or the reflection of the environment light EL emitting to the finger F, to detect a touch control operation of the user. Additionally, the optical sensor 307 can detect at least dark point to detect touch control operation of the user, which is generated via the finger shading the light SL from the light source 309, or generated via the finger F shading the environment light EL. Please note the locations of the light source, the optical sensor and the optical touch control panel may have different combinations, thus which of the methods for detecting the touch control operation is not limited and is determined according to a relation between the locations of the light source and the optical sensor, and the location of the optical touch control panel.

Figure 1A:
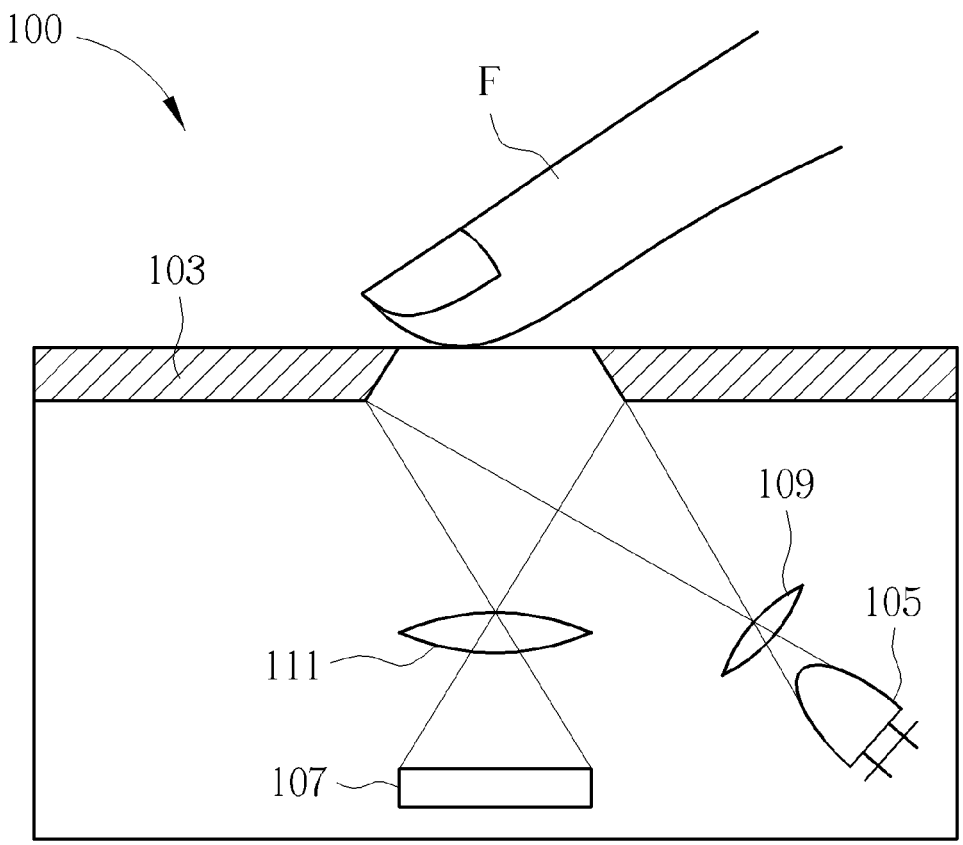
FIG. 1A and FIG. 1B are schematic diagrams illustrating a conventional optical touch control apparatus.
Figure 1B:
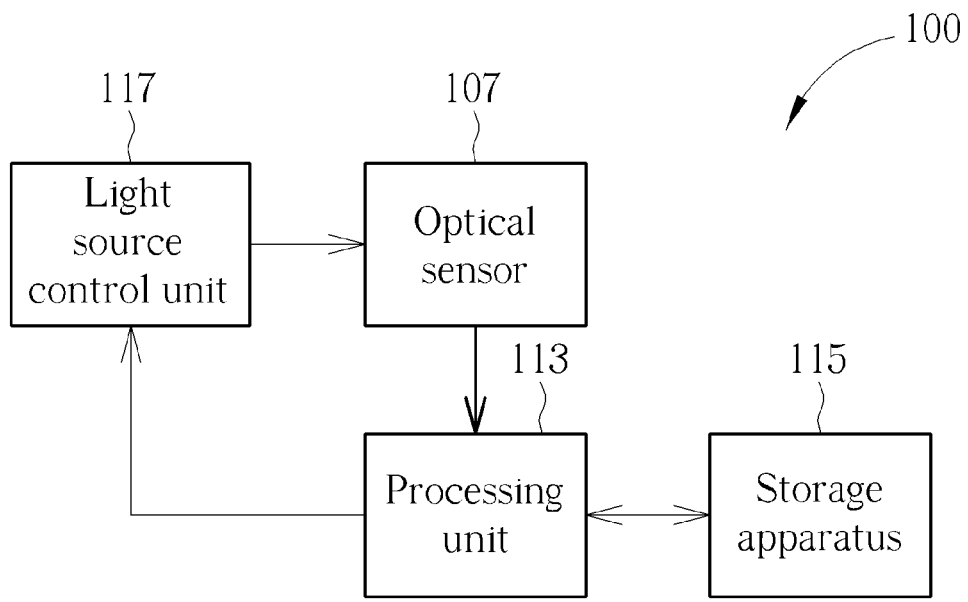
Figure 2:
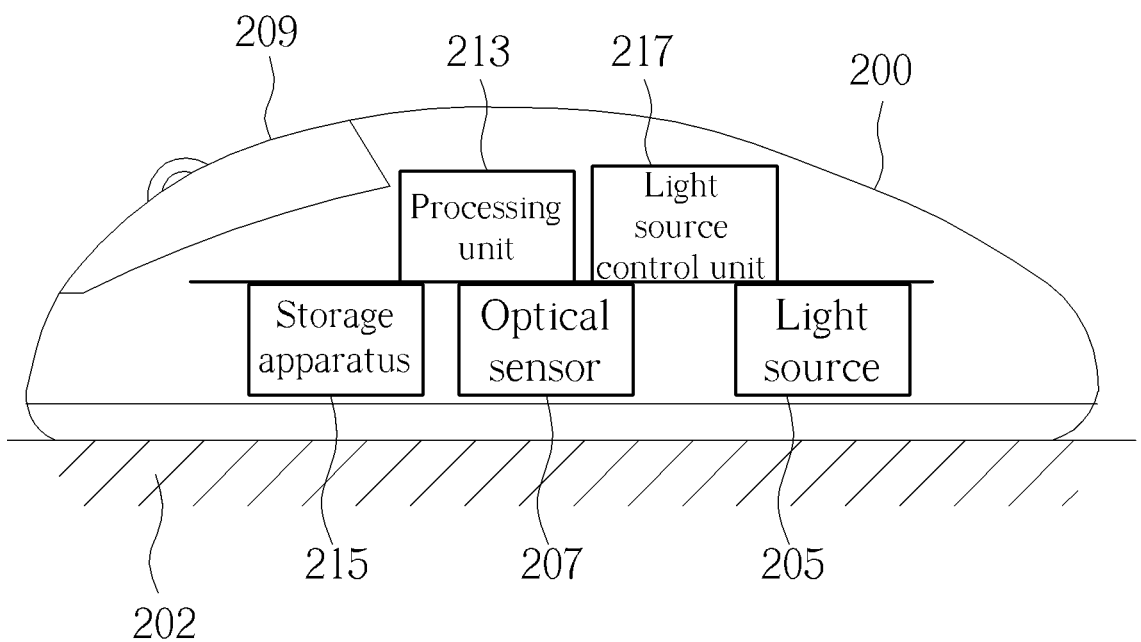
FIG. 2 is a schematic diagram illustrating a conventional optical displacement detecting apparatus.

As above-mentioned, the touch control detecting function of the optical touch control panel 301 and the displacement detecting function of the displacement detecting apparatus 303 can be performed by the optical touch control apparatus 100 shown in FIG. 1 and the optical displacement detecting apparatus 200 shown in FIG. 2, thus the optical touch control panel 301 and the displacement detecting apparatus 303 can share the optical sensor and the light source. Such that the locations for the optical sensor 307 and the light source 309 can be changed according to the design requirement, and are not limited to the locations shown in FIG. 3. Also, please note the embodiment shown in FIG. 3 is not limited to be applied to the optical touch control apparatus 100 shown in FIG. 1 and the optical displacement detecting apparatus 200 shown in FIG. 2. Also, the optical touch control panel 3 can be replaced with other types of touch control panels.

In view of above-mentioned embodiments, the sampling rate of the touch control panel can be adjusted according to the displacement of the optical navigating apparatus. Therefore, the power efficiency can be increased without affecting the sensitivity of the touch control detecting.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical navigating apparatus, comprising:
    a displacement detecting apparatus, for determining if the optical navigating apparatus has displacement relative to an target, and for generating a displacement signal according to the displacement;
    a touch control panel, for detecting a touch control operation of a user, wherein the touch control panel has a sampling rate and changes the sampling rate according to a control signal in an adjusting mode, wherein the sampling rate can be adjusted according to the displacement signal, where the sampling rate correspondingly decreases when the displacement signal indicates that the displacement increases; and
    a switch, for determining if the optical navigating apparatus enters the adjustment mode.

2. The optical navigating apparatus of claim 1, further comprising:
    a touch panel control unit, for generating the control signal.

3. The optical navigating apparatus of claim 1, wherein the optical navigating apparatus is coupled to an electronic apparatus, wherein the electronic apparatus includes a display for displaying different contents corresponding to the displacement or movement of an object on the touch control panel, where the electronic apparatus comprises a processor for controlling operation of the electronic apparatus and for generating the control signal.

4. The optical navigating apparatus of claim 1, wherein the touch control panel is an optical touch control panel with an optical sensor for receiving reflected light to detect touch control operation of a user, wherein the reflected light is generated by the touch control operation of the user.

5. The optical navigating apparatus of claim 1, wherein the touch control panel is an optical touch control panel with an optical sensor for detecting at least dark point to detect touch control operation, which is generated by light shading due to the touch control operation of a user.

6. The optical navigating apparatus of claim 1, wherein the sampling rate is increased if the displacement detecting apparatus indicates being unable to detect the displacement.

7. The optical navigating apparatus of claim 1, wherein the sampling rate is increased if the displacement detecting apparatus has detected none of the target.

8. The optical navigating apparatus of claim 1, further comprising a switch mechanism for determining if the touch control panel adjusts the sampling rate according to the displacement.

9. The optical navigating apparatus of claim 1, wherein the switch is further for determining a sampling rate range, wherein the sampling rate, after been adjusted, is within a maximum value and a minimum value of the sampling rate range.

10. The optical navigating apparatus of claim 1, wherein the switch is further for directly setting a value of the sampling rate.

11. The optical navigating apparatus of claim 1, wherein the optical navigating apparatus is an optical mouse.

12. The optical navigating apparatus of claim 1, further comprising a case, wherein the displacement detecting apparatus is provided in the case, wherein the touch control panel and the switch are provided on the case.

13. A non-transitory computer readable recording media, having at least one program code recorded thereon, an optical navigating method is performed when the program code is read and executed, wherein the optical navigating method includes:
    determining if an optical navigating apparatus has displacement relative to an target, and generating a displacement signal according to the displacement; and
    utilizing a touch control panel to detect a touch control operation of a user;
    changing a sampling rate of the touch control panel according to a control signal in an adjusting mode, wherein the sampling rate correspondingly decreases when the displacement signal indicates that the displacement increases;
    wherein the optical navigating apparatus comprises a switch for determining if the optical navigating apparatus enters the adjusting mode.

14. The non-transitory computer readable recording media of claim 13, wherein the optical navigating method comprises:
utilizing a touch panel control unit of the optical navigating apparatus to generate the control signal.

15. The non-transitory computer readable recording media of claim 13, wherein the optical navigating method comprises:
coupling the optical navigating apparatus to an electronic apparatus, wherein the electronic apparatus includes a display for displaying different contents corresponding to movement for an object on the touch control panel or the displacement; and
utilizing a processor of the electronic apparatus to control operation of the electronic apparatus and to generate the control signal.

16. The non-transitory computer readable recording media of claim 13, wherein the touch control panel is an optical touch control panel with an optical sensor, where the optical navigating method comprises:
utilizing the optical sensor to receive reflected light generated by a touch control operation of a user to detect the touch control operation.

17. The non-transitory computer readable recording media of claim 13, wherein the touch control panel is an optical touch control panel with an optical sensor, where the optical navigating method comprises:
utilizing the optical sensor to detect at least dark point to detect touch control operation, which is generated by light shading due to the touch control operation of a user.

18. The non-transitory computer readable recording media of claim 13, wherein the optical navigating method comprises:
increasing the sampling rate if none of the displacement could be detected.

19. The non-transitory computer readable recording media of claim 13, wherein the optical navigating method comprises:
increasing the sampling rate if none of the target has been detected.

20. The non-transitory readable recording media of claim 13, wherein the optical navigating apparatus comprises a case, wherein the touch control panel and the switch are provided on the case.

* * * * *